(12) United States Patent
Hashinokuchi

(10) Patent No.: US 7,959,402 B2
(45) Date of Patent: Jun. 14, 2011

(54) TRAY HOLDING APPARATUS

(75) Inventor: Yasutaka Hashinokuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 12/178,167

(22) Filed: Jul. 23, 2008

(65) Prior Publication Data
US 2009/0028688 A1   Jan. 29, 2009

(30) Foreign Application Priority Data

Jul. 25, 2007   (JP) .................................. 2007-193636

(51) Int. Cl.
*B65H 3/00*   (2006.01)
(52) U.S. Cl. ..... 414/798; 221/297; 221/221; 414/795.6; 414/795.2
(58) Field of Classification Search .................. 221/213, 221/221, 251, 297, 299; 414/331.04, 331.16, 414/788.2–788.3, 788.8, 795.3–795.4, 795.6, 414/797.4, 798, 798.4, 798.8
See application file for complete search history.

(56) References Cited

U.S. PATENT DOCUMENTS

| | | | | |
|---|---|---|---|---|
| 3,283,955 A | * | 11/1966 | Crabtree | 221/251 |
| 3,387,720 A | * | 6/1968 | Wilkin | 414/789.5 |
| 3,447,282 A | * | 6/1969 | Mumma | 53/75 |
| 3,468,455 A | * | 9/1969 | Voorhis | 221/225 |
| 3,477,592 A | * | 11/1969 | Kuhlman | 414/795.6 |
| 3,795,346 A | * | 3/1974 | Roberts et al. | 221/223 |
| 3,895,574 A | * | 7/1975 | Nyborg | 101/37 |
| 4,043,460 A | * | 8/1977 | Steele | 414/795.2 |
| 4,328,908 A | * | 5/1982 | Temming | 221/213 |
| 4,809,881 A | * | 3/1989 | Becker | 221/224 |
| 4,865,515 A | * | 9/1989 | Dorner et al. | 414/788.2 |
| 5,480,280 A | * | 1/1996 | Bordon | 414/798.1 |
| 7,021,887 B2 | * | 4/2006 | Hoe et al. | 414/796.6 |

FOREIGN PATENT DOCUMENTS

JP    2005-239298    9/2005

* cited by examiner

*Primary Examiner* — Gregory W Adams
(74) *Attorney, Agent, or Firm* — Oblon, Spivak, McClelland, Maier & Neustadt, L.L.P.

(57) ABSTRACT

A tray holding apparatus includes a holding section, a separation section, a lifting/lowering section, and a control section. The holding section holds a stack of trays. The separation section separates the lowermost tray from the stack. The lifting/lowering section moves upward or downward between a predetermined place below the stack and this stack, thereby undergoing a first movement in which the separated tray is moved to the predetermined position and a second movement in which the tray in the predetermined place is moved to the stack. The control section controls the operations of the separation section and the lifting/lowering section.

2 Claims, 18 Drawing Sheets

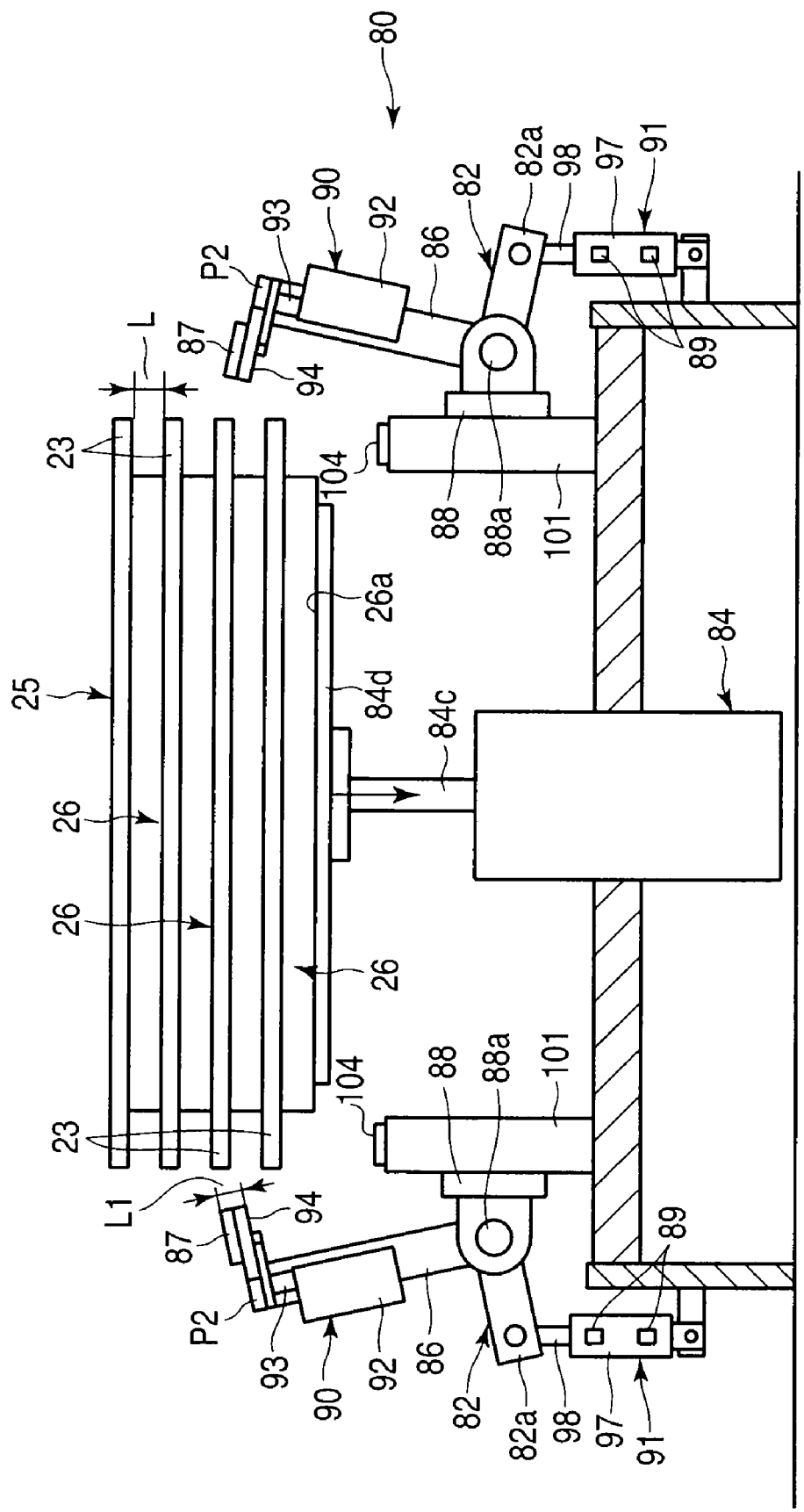
F I G. 8

TRAY HOLDING APPARATUS

CROSS-REFERENCE TO RELATED APPLICATIONS

This application is based upon and claims the benefit of priority from prior Japanese Patent Application No. 2007-193636, filed Jul. 25, 2007, the entire contents of which are incorporated herein by reference.

BACKGROUND OF THE INVENTION

1. Field of the Invention

The present invention relates to a tray holding apparatus for supplying trays that have been held or for holding trays recovered.

2. Description of the Related Art

Conventionally, some kinds of parts are mounted on to various electronic components such as liquid crystal panels by a mounting apparatus. For example, a mounting apparatus sequentially mounts semiconductor chips, flexible substrates, etc. onto liquid crystal panels.

This type of mounting apparatus includes, for example: a unit for supplying liquid crystal panels; a unit for supplying semiconductor chips to a unit that mounts the semiconductor chips; a unit for mounting the semiconductor chips on the liquid crystal panels; a unit for supplying flexible substrates to a unit that mounts the flexible substrates; a unit for mounting the flexible substrates on the liquid crystal panels on which the semiconductors have been mounted; and a unit for recovering liquid crystal panels on which the various components have been mounted. The liquid crystal panels are subject to various processes while being sequentially transferred to the unit for mounting semiconductor chips, the unit for mounting flexible substrates, and the unit for recovering the panels.

In each of the units, a group of components used in the unit is accommodated in each tray. For example, in the unit for supplying liquid crystal panels, each tray accommodates a group of liquid crystal panels that have not yet been processed, and each of the liquid crystal panels is taken out from this tray and undergoes processing. When the tray has become empty of the components, another tray accommodating similar components is prepared.

There have been proposed apparatuses that hold a plurality of trays and supply the trays one after another. Trays used in such tray supply apparatuses are arranged in a stack. The apparatus supports the lowermost tray in a stack of trays, thereby holding all the stacked trays, or allows the lowermost tray to fall, thereby supplying each tray in series.

However, trays have a recessed cross-section due to their upward projecting periphery (i.e., outer boundary or edges). Accordingly, a tray may fit into the tray lying immediately below it. This may result in such failure of supply that the lowermost tray cannot be separated from the tray lying immediately above it.

In order to avoid such a situation, this type of apparatus includes a separation unit for separating the lowermost tray. This type of separation unit includes separation members in the form of a pawl. The separation members grasp the lowermost tray and separate it downward. Such a technology has been disclosed in, for example, Jpn. Pat. Appln. KOKAI Publication No. 2005-239298.

However, the apparatus disclosed in this publication allows the lowermost tray to fall downward. This may result in a disadvantage, such as components (e.g., electronic components) accommodated in the tray scattering while falling to be supplied.

Additionally, in this publication, the apparatus that allows the lowermost tray to fall downward has been proposed, but no design for the recovery of empty trays (if required), has been disclosed.

BRIEF SUMMARY OF THE INVENTION

Accordingly, it is an object of the present invention to provide a tray holding apparatus that has the function of supplying trays accommodating components, reducing tray supply failure, and recovering the trays by the same structure as that for tray supply.

A tray holding apparatus according to the present invention comprises a holding section, a separation section, a lifting/lowering section, and a control section. The holding section holds a stack of trays. The separation section separates the lowermost tray from the stack. The lifting/lowering section moves upward or downward between a predetermined place below the stack and this stack, thereby undergoing a first movement in which the separated tray is moved to the predetermined position and a second movement in which the tray in the predetermined place is moved to the stack. The control section controls the operations of the separation section and the lifting/lowering section.

This structure is designed so that each tray is supplied by the lifting/lowering section. Accordingly, the trays can be stably supplied even when the trays accommodate components. In addition, the separation mechanism prevents failure in tray supply. The lifting/lowering section guides each tray to the stack of trays and holds the stack incorporating this tray.

According to the preferred mode of the present invention, the tray includes a tray body capable of accommodating items therein, and a flange extending in the direction of the perimeter of the tray body from the upper edge thereof. The holding section includes a pair of arms. These arms have corresponding support pawls capable of supporting the flange. The arms are supported so as to freely rotate between a first position where the support pawls support the flange from below and a second position where the support pawls are separated from the stack sidewise, and hence from the flange. The separation section includes separation pawls and driving devices. The separation pawls are supported by the corresponding arms. The separation pawls can be accommodated between the flange of a tray supported by the support pawls in the first position of the arms and the flange of a tray lying immediately below the former tray. Also, the separation pawls can be moved downward in relation to the support pawls in the first position of the arms. The driving devices are connected to the corresponding arms so as to be opposite the corresponding support pawls with corresponding rotating shafts between them. The driving device drives the corresponding arms between the first position and the second position.

This structure eliminates the need for the separation mechanism, such as suction members that uses air pipes. Accordingly, this invention is free from any piping problems arising from use of a suction member.

According to another preferred mode, the driving devices are disposed below the arms.

The present invention provides a tray holding apparatus which makes it possible to supply trays accommodating components, prevent failure in tray supply, and also recover trays by the same structure as that for the tray supply.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a front view (partly omitted) of the tray supply device in the state in which the lifting/lowering rod shown in FIG. 7 has moved downward;

DETAILED DESCRIPTION OF THE INVENTION

Figure 1:
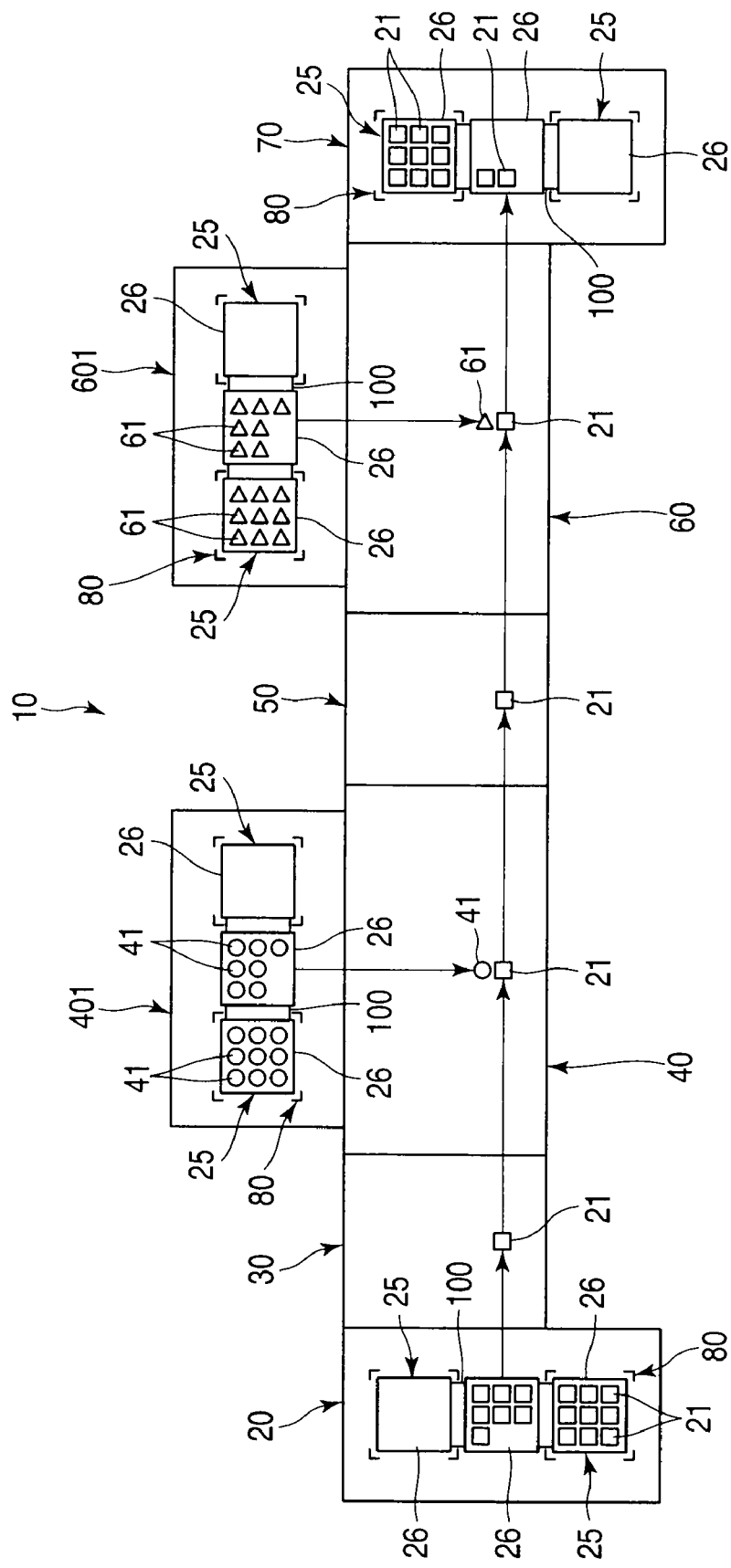
FIG. 1 is a schematic view of a mounting apparatus using a tray supply device according to one embodiment of the present invention.

A tray holding apparatus according to one embodiment of the present invention will hereinafter be described with reference to FIGS. 1 to 18. The tray holding apparatus according to the present embodiment is used in a mounting apparatus 10 as shown in FIG. 1. FIG. 1 is a schematic view of the mounting apparatus 10. The mounting apparatus 10 mounts, for example, various electronic components on a liquid crystal panel 21, which is an example of an electronic component.

As shown in FIG. 1, the mounting apparatus 10 includes: a liquid crystal panel supply unit 20 for supplying the liquid crystal panels 21; a washing unit 30 for washing the liquid crystal panels 21; an IC mounting unit 40 for mounting semiconductor chips (hereinafter referred to as "ICs") on the liquid crystal panels 21; a buffer unit 50; an FPC mounting unit 60 for mounting flexible substrates (hereinafter referred to as "FPCs") 61 on the liquid crystal panels 21; an IC supply unit 401 for supplying ICs 41 to the IC mounting unit 40; an FPC supply unit 601 for supplying the FPCs 61 to the FPC mounting unit 60; and a liquid crystal panel recovery unit 70 for recovering the liquid crystal panels 21 subjected to the above-mentioned processes.

The liquid crystal supply unit 20 is disposed on the left side in FIG. 1. The washing unit 30, IC mounting unit 40, buffer unit 50, FPC mounting unit 60, and liquid crystal panel recovery unit 70 are disposed in that order from the liquid crystal panel supply unit 20 toward the right in FIG. 1. The IC supply unit 401 is disposed on the side of the IC mounting unit 40 (i.e., the upper side in FIG. 1), and the FPC supply unit 601 is disposed on the side of the FPC mounting unit 60 (i.e., the upper side in FIG. 1).

The washing unit 30 washes each of the liquid crystal panels 21 supplied by the liquid crystal panel supply unit 20. The IC mounting unit 40 mounts each IC 41, supplied from the IC supply unit 401, onto the liquid crystal panel 21 washed by the washing unit 30. The buffer unit 50 keeps the liquid crystal panel 21, on which the ICs 41 have been mounted by the IC mounting unit 40, in position until the processing area of the FPC mounting unit 60 (described below) becomes empty. When the processing area of the FPC mounting unit 60 becomes empty, the buffer unit 50 transfers the liquid crystal panels 21 to the FPC mounting unit 60 one after another.

The FPC mounting unit 60 mounts each FPC 61, supplied from the FPC supply unit 601, onto the liquid crystal panel 21 passed through the buffer unit 50. The liquid crystal panel recovery unit 70 recovers each of the liquid crystal panels 21 on which the FPCs 61 have been mounted.

Each of the units 20 to 70 is equipped with moving devices such as robot arms (not shown). Each of the liquid crystal panels 21 is moved between the units adjacent to one another by these moving devices.

Figure 2:
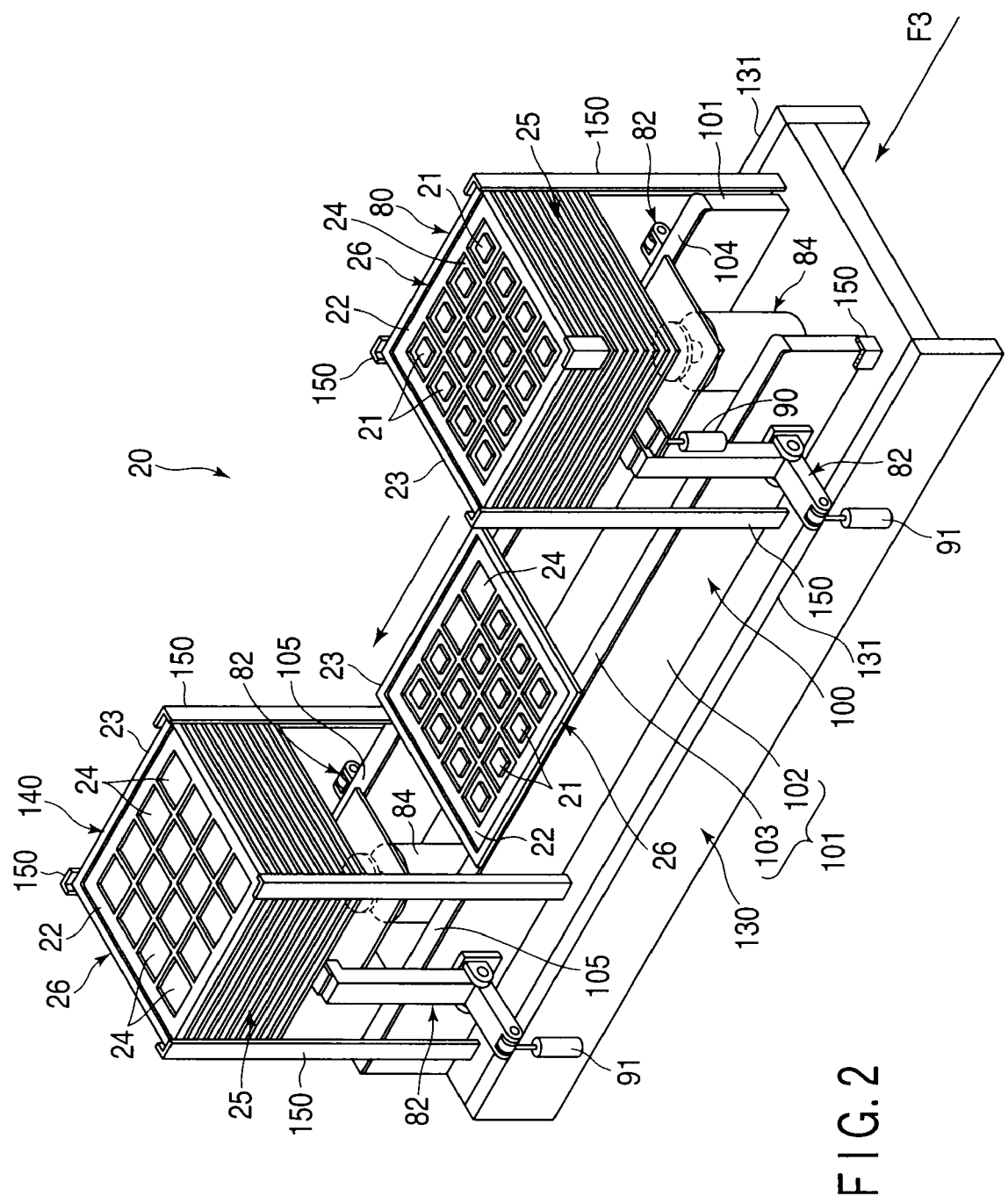
FIG. 2 is a perspective view schematically showing a liquid crystal panel supply unit shown in FIG. 1.
Figure 3:
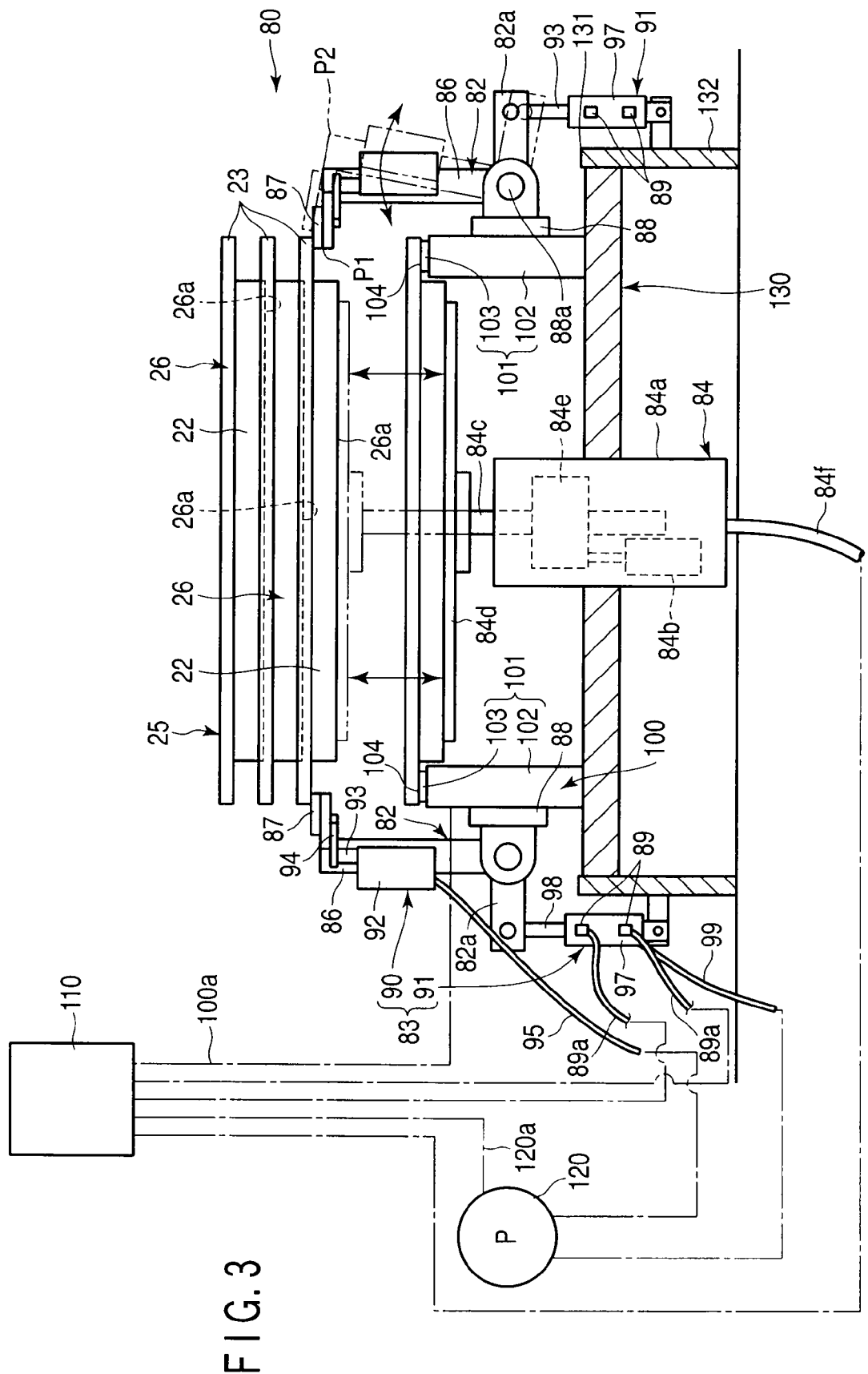
FIG. 3 is a front view (partly omitted) showing the liquid crystal panel supply unit, as viewed from the direction of arrow F3 indicated in FIG. 2.

FIG. 2 is a perspective view schematically showing the liquid crystal panel supply unit 20. As shown in FIG. 2, the liquid crystal panel supply unit 20 includes a base 130, a tray supply device 80, a tray recovery device 140, a belt conveyor 100, a control device 110 (FIG. 3), and an air pump 120 (FIG. 3).

Each tray 26 accommodating components is supplied by the tray supply device 80, and then each of the components is taken out from the tray 26. Then, the tray 26 that has been emptied is recovered by the tray recovery device 140. The belt conveyor 100 extends between the tray supply device 80 and tray recovery device 140. Each tray 26 moves from the tray supply device 80 to the tray recovery device 140 by means of the belt conveyor 100.

The structures of the IC supply unit 401, FPC supply unit 601, and liquid crystal panel recovery unit 70 may be substantially the same as the structure of the liquid crystal panel supply unit 20. Therefore, a description is given of the liquid crystal panel supply unit 20 as a representative example of the structures for the units 20, 70, 401, and 601.

As shown in FIGS. 1 and 2, the tray supply device 80 holds a stack 25 of the trays 26. Each of the trays 26 held by the tray supply device 80 accommodates the liquid crystal panels 21.

FIG. 3 is a sectional view (partly omitted) showing the liquid crystal panel supply unit 20, as viewed from the direction of arrow F3 indicated in FIG. 2. That is, FIG. 3 is a view (partly omitted) showing the tray supply device 80 as viewed from its front.

The shape of the tray 26 will be described in detail below. As shown in FIG. 2, each tray 26 has a tray body 22 and flanges 23. The tray body 22 is in the form of a plate and has a plurality of accommodating recesses 24.

The recesses 24 are formed in the tray body 22 such that each recess has a hollow vertical section. Each accommodating recess 24 holds one liquid crystal panel 21. As shown in FIG. 1, in the IC supply unit 401, the ICs 41 are accommodated in the recesses 24.

Each tray 26 used in the IC supply unit 401 holds a sub-tray (not shown) in the accommodating recess 24. The sub-tray has a plurality of recesses, in which the ICs 41 are accommodated. As for the trays 26 used in the FPC supply unit 601, no accommodating recesses are formed therein; and FPCs 61 are accommodated in sub-trays (not shown), which are held in the tray 26. In the liquid crystal panel recovery unit 70, the liquid crystal panels 21 are recovered and held in the accommodating recesses 24.

As shown in FIG. 2, the flanges 23 are formed integrally with the perimeter edges of the tray body 22 and extend out in a direction from the perimeter of the tray body 22. A predetermined distance is defined between the top faces of the tray body 22 and each flange 23. In other words, the structure of each tray 26 is such that each group of accommodating recesses 24 is formed downward in the tray body so as to be a certain distance inward from the perimeter.

Due to this structure of the trays 26, the trays 26 are stacked, as shown in FIG. 3, such that an underside 26a of each tray 26 (i.e., the tray body 22) fits in the area surrounded by the flanges 23 of the immediately underlying tray 26. Thus, the trays 26 are arranged on top of one another to form the stack 25.

As shown in FIGS. 2 and 3, disposed on the base 130 are the belt conveyor 100, tray supply device 80, and tray recovery device 140.

As shown in FIG. 3, the belt conveyor 100 extends between the tray supply device 80 (described below) and tray recovery device 140 (described below), and includes a pair of rails 101. Each of the rails 101 has a rail body 102 and a belt 103.

As shown in FIG. 2, the rail bodies 102 form parallel walls that extend from the tray supply device 80 to the tray recovery device 140. The rails 101 are laid substantially equidistant from the corresponding outer edges 131 (i.e., edges extending along the corresponding rails 101) of the base 130.

Each belt 103 extends along the top edges of the corresponding rail body 102. The rail body 102 has accommodated therein a belt moving mechanism (not shown) by means of which the belt 103 moves along the top edge of the rail body 102.

The belt conveyor 100 moves each tray 26, supplied by the tray supply device 80, to the place where the liquid crystal panels 21 are supplied (i.e., the place where a moving device such as a robot arm takes the liquid crystal panels 21 from the tray 26). When the liquid crystal panels 21 in the tray 26 are emptied, the conveyor 100 moves the tray 26 to the tray recovery device 140.

The tray supply device 80 is an example of the tray holding apparatus according to the present invention and, as shown in FIGS. 2 and 3, includes: a pair of arms 82; guide members 150; separation members 83; and a lifting/lowering device 84.

As shown in FIG. 2, each of the guide members 150 is a rail member of a substantially L-shaped cross-section. The guide members 150 are fixed to the base 130 and hold the four corners of each stack 25 of trays. The guide members 150 are devised so as not to hinder the upward/downward movement of each stack 25 and hence so as not to produce significant friction between the guide members 150 and the stack 25 either. The guide members 150 are one example of a holding section according to the present invention. In FIG. 3, the guide members 150 are omitted.

Figure 4:
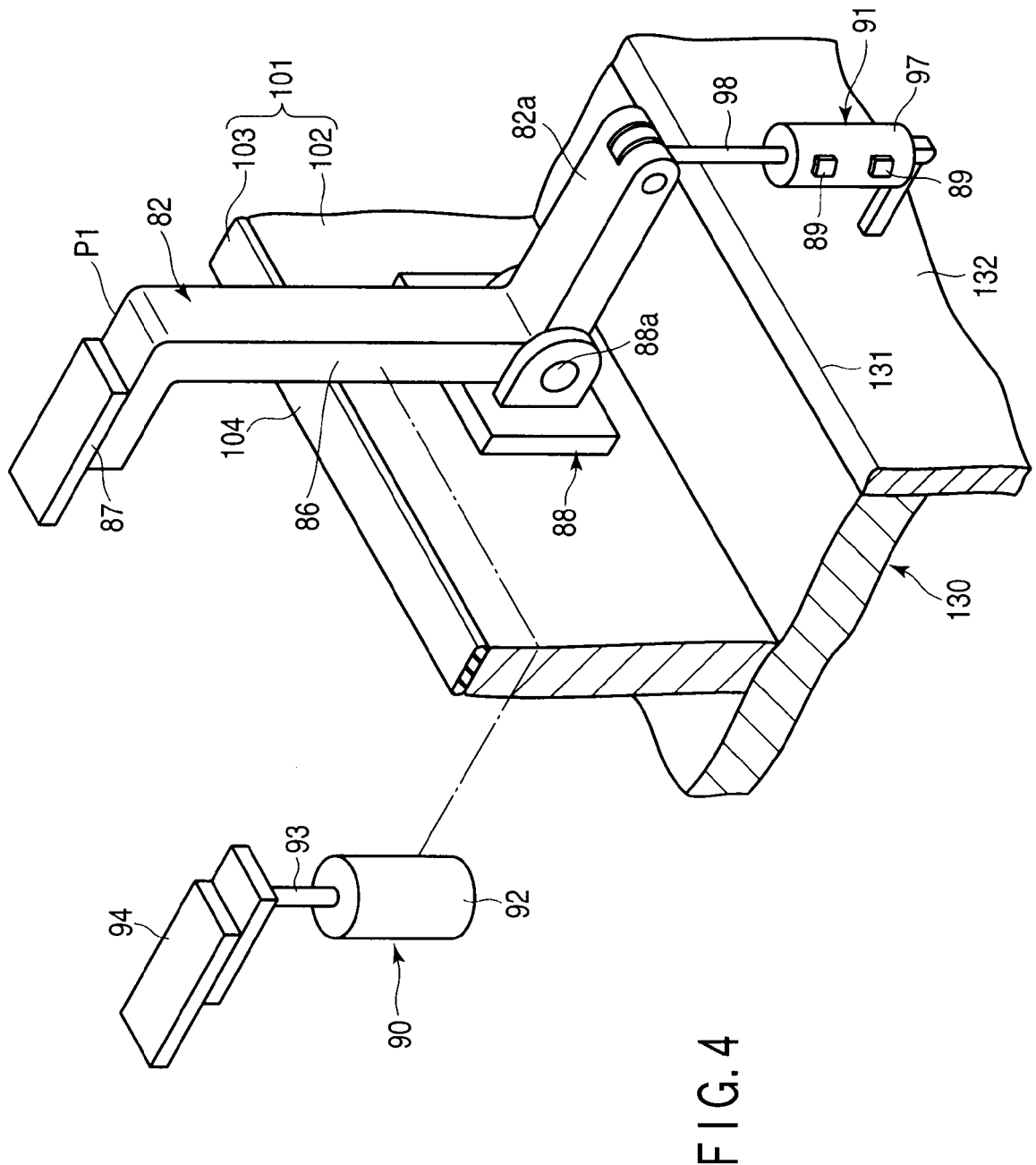
FIG. 4 is an enlarged perspective view of one of a pair of arms shown in FIG. 3.

FIG. 4 is an enlarged perspective view of one of the pair of arms 82. As shown in FIGS. 3 and 4, the arm 82 is substantially L-shaped. As shown in FIG. 3, one of the pair of arms 82 is supported by the rail body 102 of one of the pair of rails 101 and, the other arm 82 by the rail body 102 of the other of the pair of rails 101, such that the arms 82 are opposite to each other and may freely rotate.

The pair of arms 82 holds each stack 25 of the trays 26. In this respect, a description will be given in detail below. Each of the arms 82 may rotate freely between a first position P1 where the stack 25 of the trays 26 is held and a second position P2 where no stack 25 is held.

Each arm 82 is supported on the external face of the rail body 102 of the corresponding rail 101 so as to rotate freely. Specifically, the arm 82 is supported so as to rotate freely from the inside of the belt conveyor 100 toward the outside thereof and from the outside of the belt conveyor 100 toward the inside thereof (i.e., so as to rotate freely transverse to the belt conveyor 100).

Each arm 82 includes: an arm body 86 extending almost vertically in the first position P1; and a support pawl 87 projecting toward the inside of the belt conveyor 100 in the first position, thereby supporting the stack 25. The rail body 102 of the rail 101 supports the lower end of the arm body 86 via a rotating support part 88 so that the arm body 86 may freely rotate around a rotation shaft 88a. The support pawl 87 projects from the upper end of the arm body 86.

When the pair of arms 82 is in the first position P1, the opposite support pawls 87 of the arms 82 support the flanges 23 of the lowermost tray 26 of the stack 25 from below as shown in FIG. 3. When these arms 82 have turned to the second position P2, as shown by a line of alternate long and two short dashes in FIG. 3, the support pawls 87 are released from supporting the flanges 23 of the tray 26.

The first and second positions P1 and P2 of the one of the pair of arms 82 relative to the corresponding rail body 102 to which this arm 82 is attached, and those of the other of the pair of arms 82, may be the same. Accordingly, the first and second positions P1 and P2 of the one of the arms 82 (the right one in FIG. 3) are indicated by lines of alternate long and two short dashes as the representative examples. The arms 82 are another example of the holding section of the present invention.

The separation mechanisms 83 are examples of the separation section according to the present invention. Each of the separation mechanisms 83 includes a separation device 90 for separating the lowermost tray 26 from each stack 25, and a rotating device 91 for rotating the corresponding arm 82. The separation device 90 is fixed to the arm body 86 of the arm 82. FIG. 4 shows the separation device 90 separated from the arm 82, for the purposes of clarity.

As shown in FIG. 4, the separation device 90 includes a separation cylinder 92, a separation rod 93, and a separation pawl 94. The separation cylinder 92 is fixed to the arm body 86. The separation rod 93 is accommodated in the separation cylinder 92. When the arm 82 is in the first position P1, the separation rod 93 moves vertically in relation to the separation cylinder 92.

The separation pawl 94 is attached to the leading end of the separation rod 93. The separation pawl 94, for example, lies on the underside of the support pawl 87 of the arm 82. As shown in FIG. 3, the separation cylinder 92 is connected to, for example, the air pump 120 via a pipe 95. The separation cylinder 92 is supplied with air, which is an example of an actuating fluid, via the pipe 95. The separation rod moves alternately backward and forward in relation to the separation cylinder 92 by means of air supplied from the air pump 120, and thereby moves the separation pawl 94.

The rotating devices 91 are an example of the driving device according to the present invention. As shown in FIG. 4, each of the rotating devices 91 includes a rotating cylinder 97 and a rotating rod 98. The rotating cylinder 97 is fixed to a side face 132 of the base 130. The rotating rod 98 is accommodated in the rotating cylinder 97 so as to be vertically movable, and is connected to the arm 82.

In this respect, a description will be given in detail below. An end 82a of the arm 82, which end is opposite the support pawl 87 with the rotating shaft 88a between them, projects beyond the base 130 when the arm 82 is in the first position P1. Specifically, the angle of the end 82a to the arm body 86 approaches 90°. The end 82a extends almost above the rotating device 91. The rotating rod 98 is connected to the end 82a of the arm 82 so as to rotate freely.

As shown in FIG. 3, the rotating cylinder 97 is connected to the air pump 120 via the pipe 99. The rotating cylinder 97 is supplied with air via the pipe 99. The rotating rod 98 moves vertically by means of the air supplied by the air pump 120.

The vertical movement of the rotating rod 98 moves the arm 82 around the rotation shaft 88a, thus enabling the arm 82 to rotate between the first and second positions P1 and P2.

Each rotating device 91 is equipped with sensors 89 for detecting the position of the corresponding arm 82. The sensors 89 are, for example, limit sensors. The sensors 89 are attached to, for example, the rotating cylinder 97 in a pair. The sensors 89 are vertically apart from each other, and detect whether the rotating rod 98 is in the first position P1 or second position P2. The sensors 89 are not limited to the limit sensors but may be a rotary encoder or potentiometer, which may be attached to the rotating support part 88 so as to detect the number of rotations of the arm 82, and hence the position of the arm 82. In short, any sensors capable of detecting the position of the arm 82 will suffice.

Referring back to FIG. 2, there is shown the lifting/lowering device 84 disposed between the pair of arms 82. As shown in FIG. 3, the lifting/lowering device 84 includes a housing 84a, a motor 84b, a lifting/lowering rod 84c, a plate 84d, and a transmission mechanism 84e. The housing 84a is fixed to the base 130.

The motor 84b, which is shown by broken lines in FIG. 3 is accommodated in the housing 84a. The lifting/lowering rod 84c is partly accommodated in the housing 84a and is supported so as to be vertically movable in relation to the housing 84a. Part of the lifting/lowering device 84c, accommodated in the housing 84a, is shown by dotted lines in FIG. 3.

The plate 84d is attached to the leading end of the lifting/lowering rod 84c. The transmission mechanism 84e is accommodated in the housing 84a. The transmission mechanism 84e includes, for example, a plurality of gears (not shown), and has a function to change the rotating motion of the motor 84b into the upward or downward motion of the lifting/lowering rod 84c. The transmission mechanism 84e is also shown by a broken line in FIG. 3.

The control device 110 is the control section according to the present invention. As shown in FIG. 3, the control device 110 is electrically connected to the belt conveyor 100, air pump 120, lifting/lowering device 84, and sensors 89 via wires 100a, 120a, 84f, and 89a respectively.

The control device 110 controls the operation of the belt conveyor 100, the supply of air from the air pump 120, and the drive of the motor 84b for the lifting/lowering device 84. The control device 110 monitors the rotation of the motor 84b, thereby determining the position of the lifting/lowering rod 84c.

The position of the lifting/lowering rod 84c may be detected using, for instance, a sensor provided independently of the ones described above. Based on the positions of the arms 82 detected by the sensors 89 and the position of the lifting/lowering rod 84c, the control device 110 exerts each form of control as mentioned above.

Incidentally, shown on the left in FIG. 3 are the wires 100a, 120a, 84f, 89a and pipes 95 and 99 connected to the separation device 90, rotating device 91, and sensors 89. On the other hand, no wires or pipes for the other separation device 90, rotating device 91 and sensors 89 are shown on the right in FIG. 3 for purposes of clarity in the explanation of the movement of the arm 82 shown by the lines of alternate long and pairs of short dashes. However, the same wires and pipes are connected to the separation device 90, rotating device 91, and sensors 89 shown on the right in FIG. 3.

The structure of the tray recovering device 140 may be substantially identical to that of the tray supply device 80 and explanation thereof is omitted.

Next will be described the operation of the liquid crystal panel supply unit 20. First, the trays 26, each accommodating the liquid crystal panels 21, are moved to the processing position of the moving device (e.g., robot arm).

Figure 5:
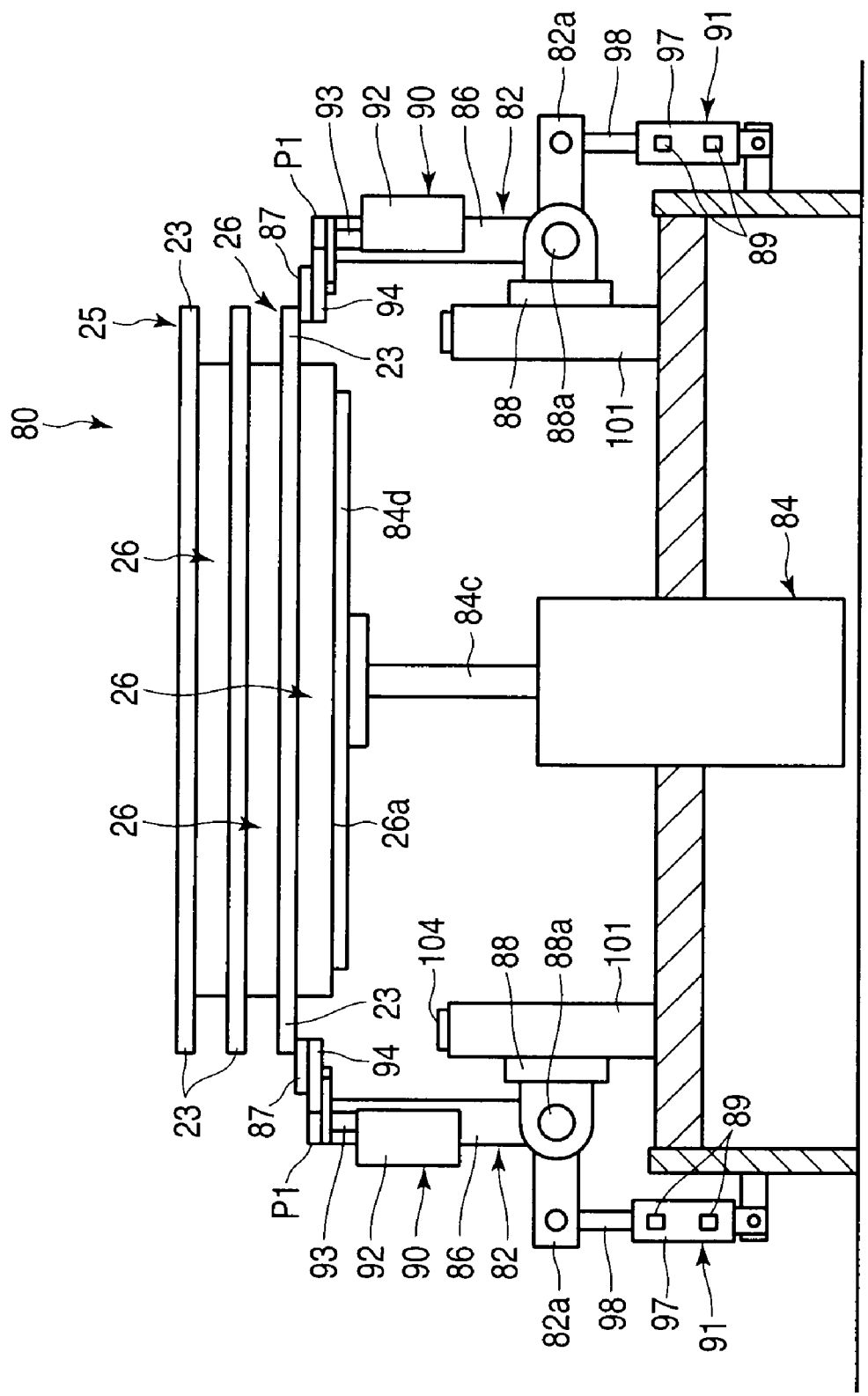
FIG. 5 is a front view (partly omitted) of the tray supply device in the state in which a lifting/lowering rod of a lifting/lowering device shown in FIG. 3 has extended to the lowermost tray.

To be specific, the tray supply device 80 first supplies the trays 26. To be more specific, the tray supply device 80 separates the lowermost tray 26 from the stack 25. FIG. 5 shows the state in which the lifting/lowering rod 84c of the lifting/lowering device 84 has extended to the lowermost tray 26. As shown in FIG. 5, in order to separate the lowermost tray 26, the control device 110 moves the lifting/lowering rod 84c to the position where the plate 84d comes into contact with the underside 26a of the lowermost tray 26.

Figure 6:
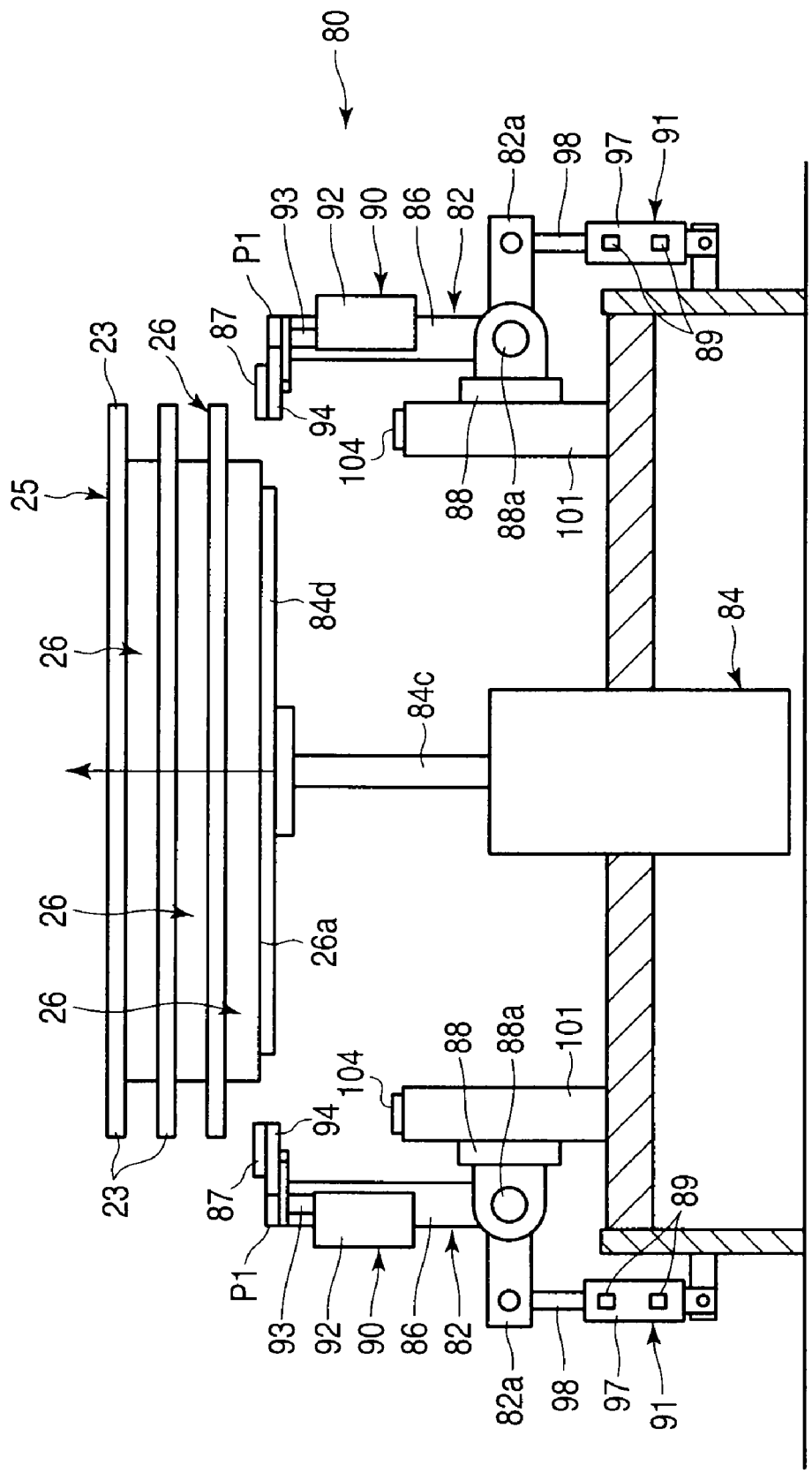
FIG. 6 is a front view (partly omitted) of the tray supply device in the state in which the lifting/lowering rod has moved to the place where the lowermost tray is separated from the support pawls of the arms shown in FIG. 5.

FIG. 6 shows the state in which the lifting/lowering rod 84c has moved to the place where the lowermost tray 26 is separated from the support pawls 87 of the pair of arms 82. As shown in FIG. 6, the control device 110 lifts the stack 25 to the place where the flanges 23 of the lowermost tray 26 separate from the support pawls 87, so that the support pawls 87 can then rotate from the first position P1 to the second position P2.

The locus of the leading end of each support pawl 87 is arcuate due to the rotation of the corresponding arm 82 between the first and second positions P1 and P2. Therefore, the control device 110 lifts the stack 25 to the place where the flanges 23 of the lowermost tray 26 separate from the locus of the movement of the leading end of the support pawl 87.

Figure 7:
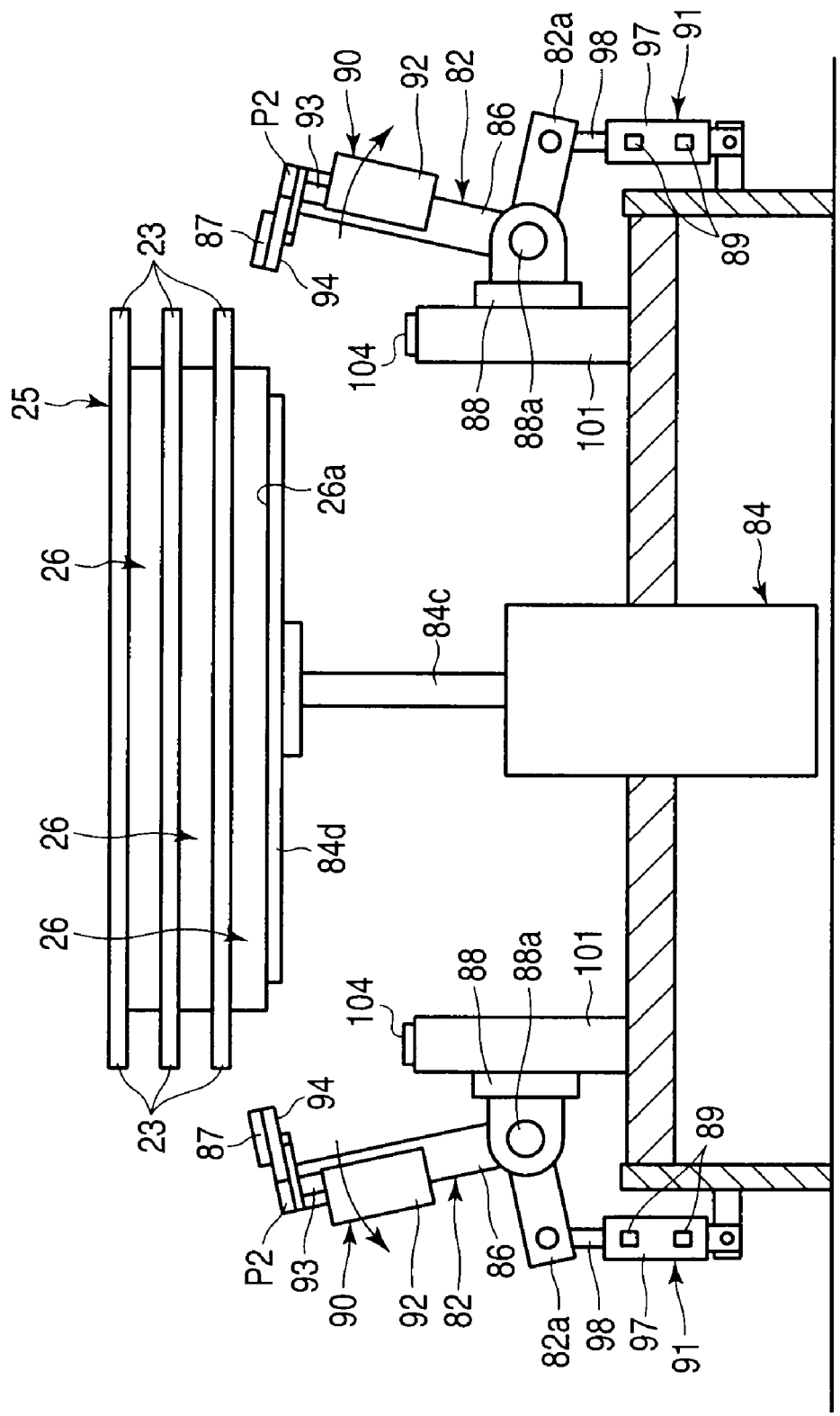
FIG. 7 is a front view (partly omitted) of the tray supply device in the state in which a rotating rod shown in FIG. 6 has rotated to a second position.

When the stack 25 is lifted to the place where the stack 25 is separated from the locus of the movement of the support pawls 87, the control device 110 drives the pair of rotating rods 98 via the air pump 120, as shown in FIG. 7. As the rotating rods 98 move downward, the leading ends 82*a* of the pair of arms 82 also move downward. That is, the arms 82 rotate to the second position P2, as shown in FIG. 7.

The position of each arm 82 is detected by the plurality of sensors 89. Based on the result of detection by the sensors 89, the control device 110 discerns the positions of the arms 82 and also controls the drive of the air pump 120.

When the arms 82 have been rotated to the second position P2, the control device 110 drives the motor 84*b*, thereby moving downward the lifting/lowering rod 84*c* and the stack 25. When each arm 82 has returned to the first position P1, as shown in FIG. 8, the stack 25 is moved to the place where the support pawl 87 of the arm 82 and the separation pawl 94 of the separation device 90 are accommodated into a gap L defined between the flanges 23 of the lowermost tray 26 and the flanges 23 of the tray 26 disposed immediately above it.

In this respect, a description will be given in detail below. The predetermined amount of gap L is defined between the flanges of the adjacent trays 26 arranged in the stack. The support pawl 87 and separation pawl 94 together have dimensions such as can be accommodated in the gap L. The thicknesses of the support pawl 87 and separation pawl 94 are determined so that the locus of the support pawl 87 and separation pawl 94 returning together from the second position P2 to the first position P1 does not interfere with the corresponding flanges 23. That is, the combined thickness L1 of the support pawl 87 and separation pawl 94 is less than the gap L.

Figure 9:
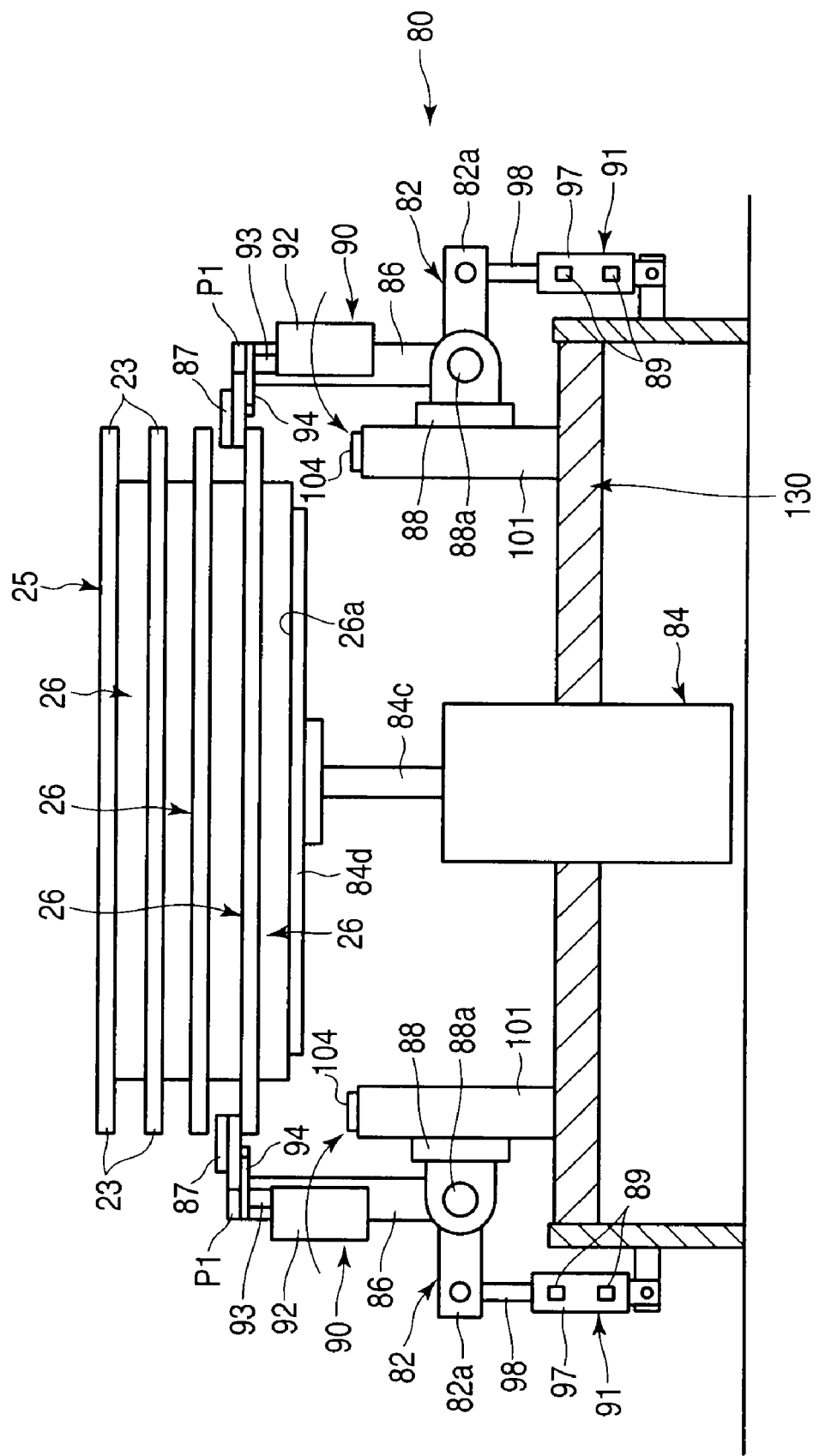
FIG. 9 is a front view (partly omitted) of the tray supply device in the state in which the arms shown in FIG. 8 have moved to a first position.

As shown in FIG. 8, when the stack 25 is lowered to the place where the support pawl 87 and separation pawl 94 can be accommodated in the gap between the flanges 23 of the lowermost tray 26 and the flanges 23 of the tray 26 immediately above it, the control device 110 drives the rotating rods 98 via the air pump 120, thereby returning the arms 82 to the first position P1, as shown in FIG. 9.

When each of the pair of arms 82 has returned from the second position P2 to the first position P1, a slight gap is left between the support pawl 87 and the flanges 23 of the tray 26 located immediately above the support pawl 87 as shown in FIG. 9. In this state, the stack 25 is still supported by the lifting/lowering rod 84*c* of the lifting/lowering device 84.

Figure 10:
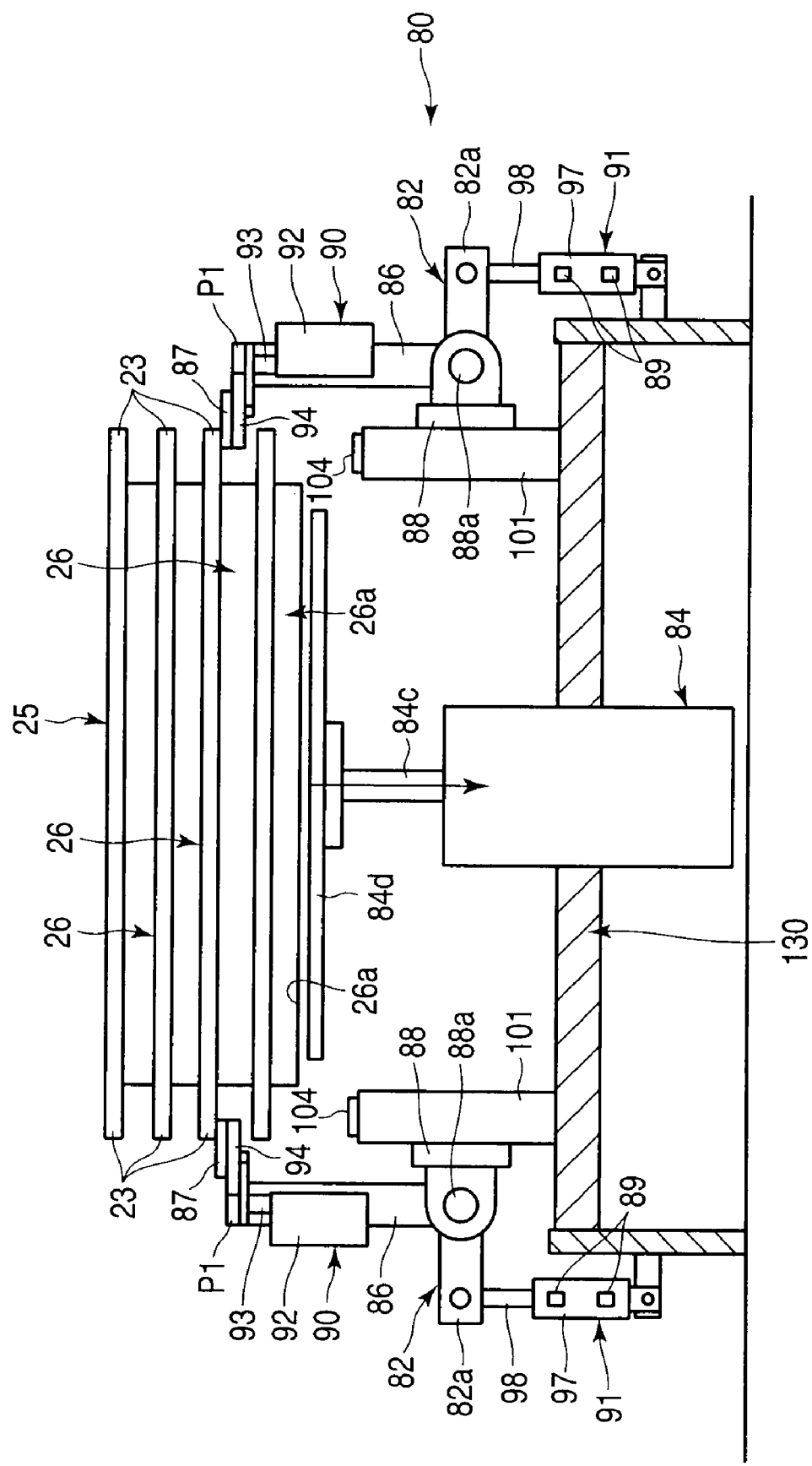
FIG. 10 is a front view (partly omitted) of the tray supply device in the state in which the flanges of a tray lying immediately above the lowermost tray shown in FIG. 9 have been lowered to the place where these flanges come into contact with the support pawls.

When the arms 82 have returned to the first position P1, the control device 110 drives the motor 84*b*, thereby moving the lifting/lowering rod 84*c* downward. As shown in FIG. 10, when the lifting/lowering rod 84*c* descends, the flanges 23 of the tray 26 immediately above the lowermost tray 26 come into contact with the corresponding support pawls 87.

When the lifting/lowering rod 84*c* moves to a further lower position, only the trays 26 above the lowermost tray 26 of the stack 25 are supported by the pair of arms (i.e., support pawls 87) whereas only the lowermost tray 26 is supported by the plate 84*d*. Accordingly, only the tray 26 supported by the plate 84*d* moves downward as the lifting/lowering rod 84*c* moves downward.

However, the bottom of each tray body 22 is fitted in the tray 26 lying immediately below it. This could result in a state in which, even when the lifting/lowering rod 84 has descended, the tray 26 immediately above the lowermost tray 26 remains fitted in the lowermost tray 26.

The present invention avoids such a state in the manner described below. When the lifting/lowering rod 84*c* has descended a predetermined distance, specifically, when the rod 84*c* has descended to a predetermined level that ensures the separation of the lowermost tray 26 from the tray 26 immediately above it, the control device 110 moves the pair of separation rods 93 downward with the aid of the air pump 120. The predetermined level renders separation of the lowermost tray 26 from the tray 26 immediately above it without causing the upper one to remain fitted in the lower one.

Thereby, the separation pawls 94 move downward and away from the corresponding support pawls 87. Consequently, only the lowermost tray 26 is moved downward by the separation pawls 94.

Figure 11:
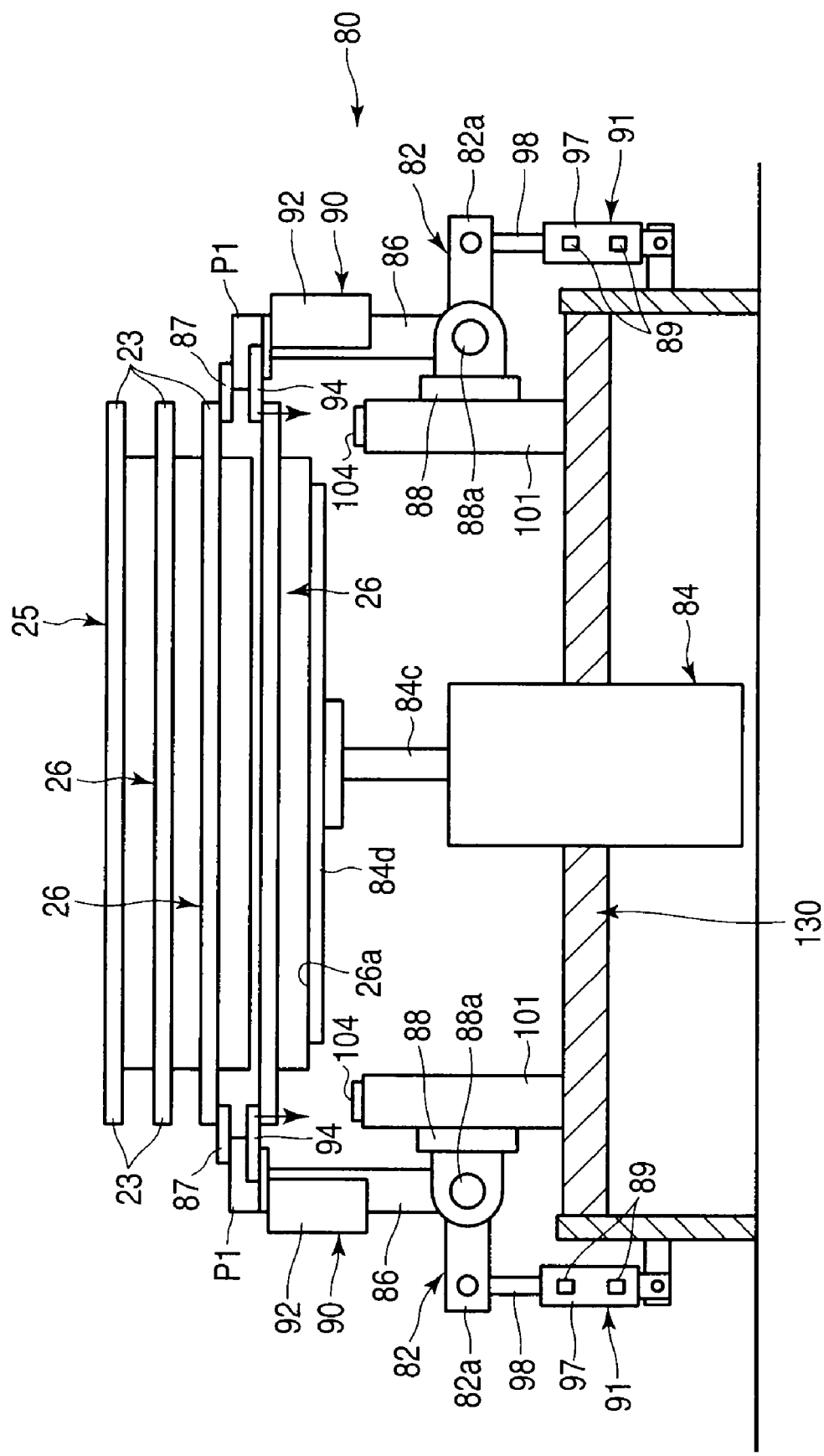
FIG. 11 is a front view (partly omitted) of the tray supply device in the state in which the lowermost tray has been separated by the movement of the separation pawls shown in FIG. 10.

As shown in FIG. 11, such movement of the separation pawls 94 separates the lowermost tray 26 from the tray 26 immediately above it. The tray 26 thus separated falls onto the plate 84*d*. In this case, almost no adverse effect of falling is exerted on the tray 26 because the distance between the lowermost tray 26 before the fall and the plate 84*d* is short.

Subsequently, the lifting/lowering rod 84*c* descends together with the tray 26 separated.

Figure 12:
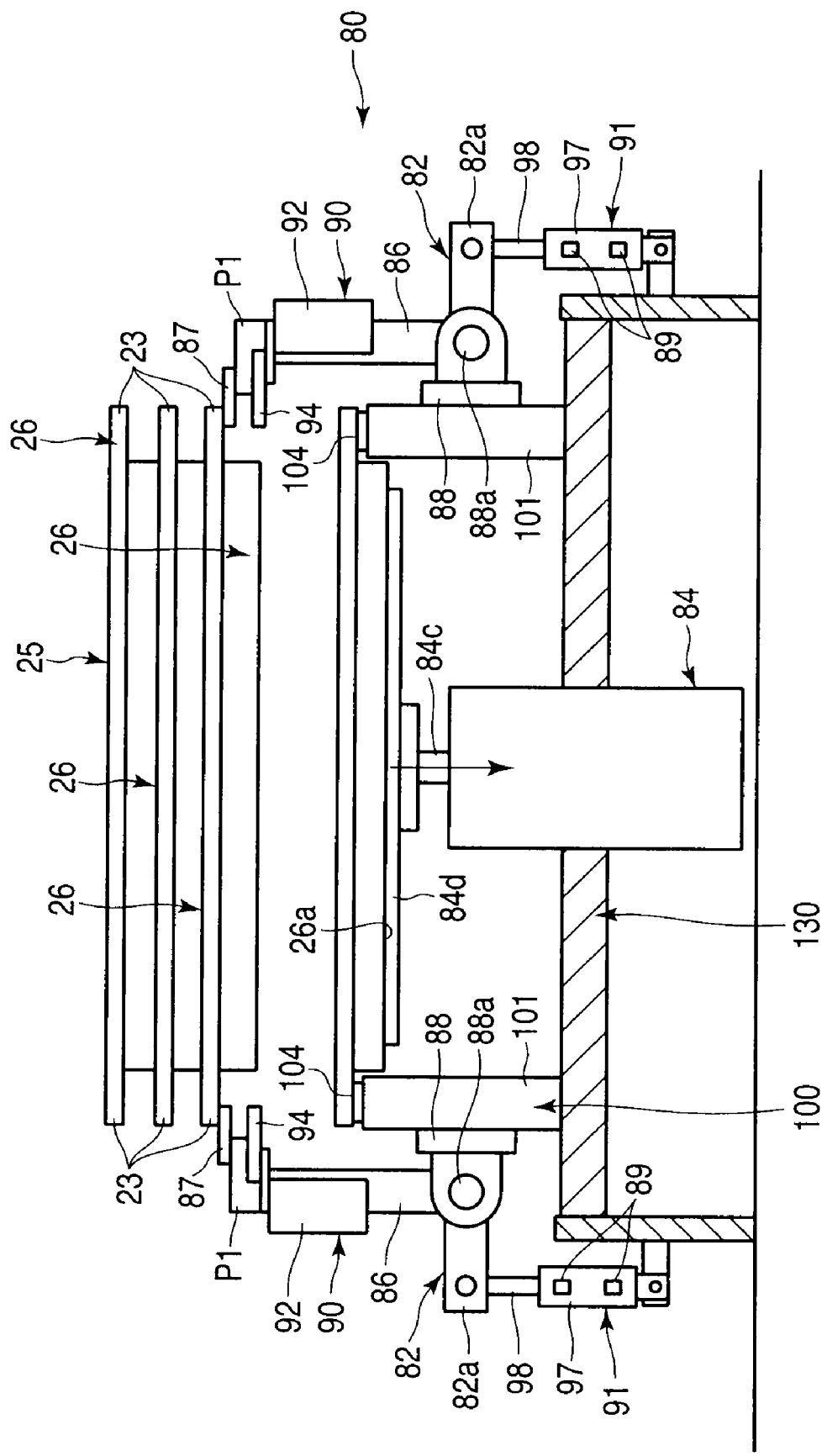
FIG. 12 is a front view (partly omitted) of the tray supply device in the state in which the separated tray shown in FIG. 11 has been lowered to the place where this tray is placed on a belt conveyor.

As shown in FIG. 12, as the lifting/lowering rod 84*c* moves to a further lower position, the tray 26 thus separated is placed onto the above-mentioned pair of belt conveyors 100. In response to the placement of the tray 26 on the belt conveyors 100, the control device 110 drives the belt conveyors 100.

Placement of the tray 26 on the belt conveyors 100 may be determined based on, for example, the position of the lifting/lowering rod 84*c*. In this case, the position of the lifting/lowering rod 84*c* when the tray 26 is placed on the belt conveyors 100 needs to be predetermined.

The areas 104 (FIG. 2) of the pair of belt conveyors 100 located below the tray supply device 80 are examples of predetermined places according to the present invention.

When the separated tray 26 has been moved to the processing position of the moving device (e.g., the position shown in FIG. 2), the drive of the belt conveyors 100 is stopped. The determination whether each tray 26 has reached the processing position or not is made by using a sensor or the like (not shown). In this position, each of the liquid crystal panels 21 is removed from the tray 26.

After all the liquid crystal panels 21 in the tray 26 have been removed, the control device 110 drives the belt conveyors 100 again, thereby moving the empty tray 26 to the tray recovery device 140. As mentioned above, the structure of the tray recovery device 140 is substantially identical to that of the tray supply device 80.

Figure 13:
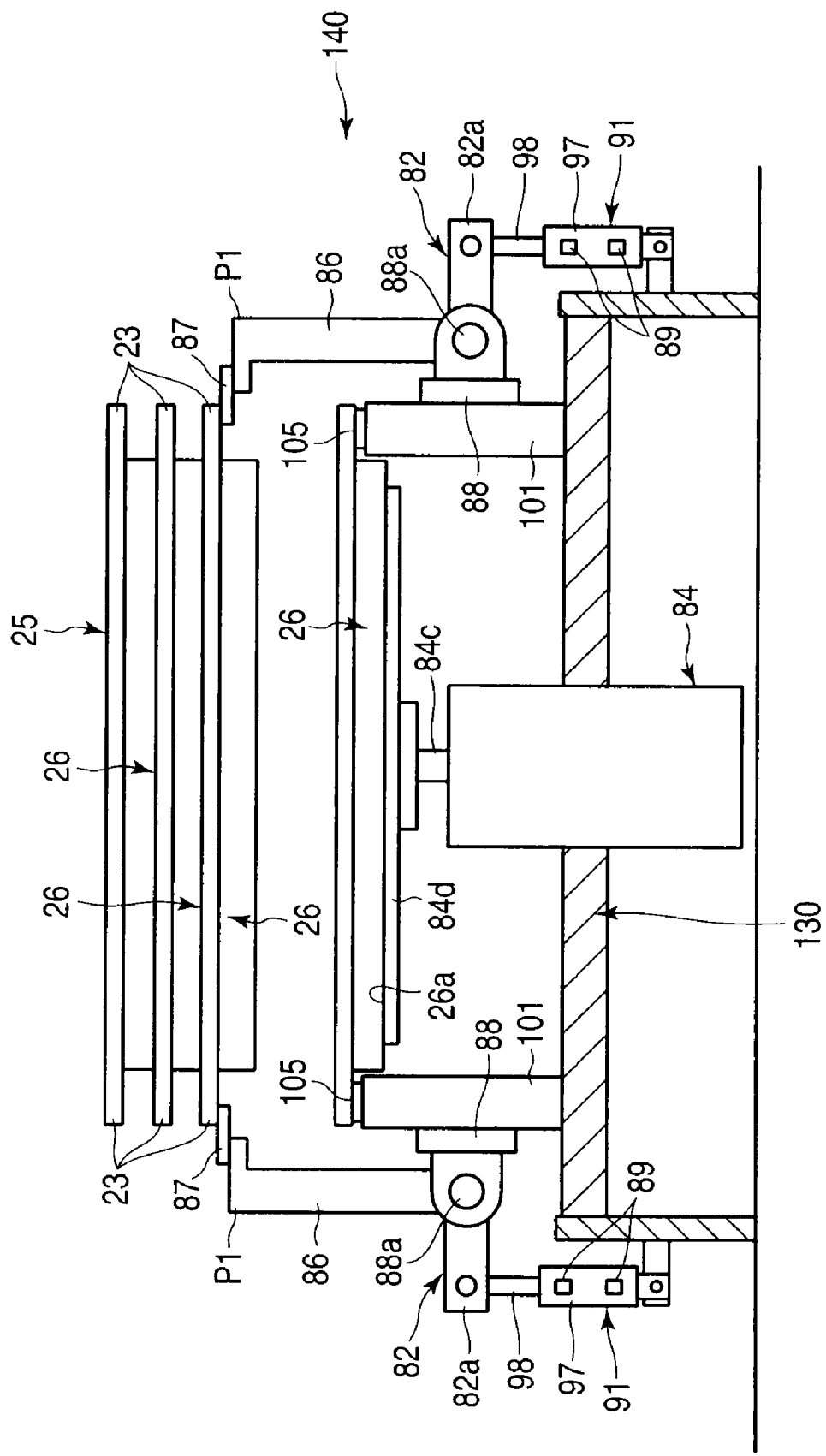
FIG. 13 is a front view (partly omitted) of a tray recovery device in the state in which an empty tray has been moved to the place below the tray recovery device.

As shown in FIG. 13, when the empty tray 26 has been moved to a position below the tray recovery device 140, the control device 110 stops the operation of the belt conveyors 100. In the belt conveyors 100, the areas 105 located below the tray recovery device 140 are examples of predetermined places according to the present invention.

Subsequently, the control device 110 lifts the lifting/lowering rod 84*c* using the motor 84*b* of the lifting/lowering device 84 of the tray recovery device 140. Consequently, the lifting/lowering rod 84*c* lifts the empty tray 26. The tray recovery device 140 has been holding the stack 25 of empty trays 26, which have already been recovered.

Figure 14:
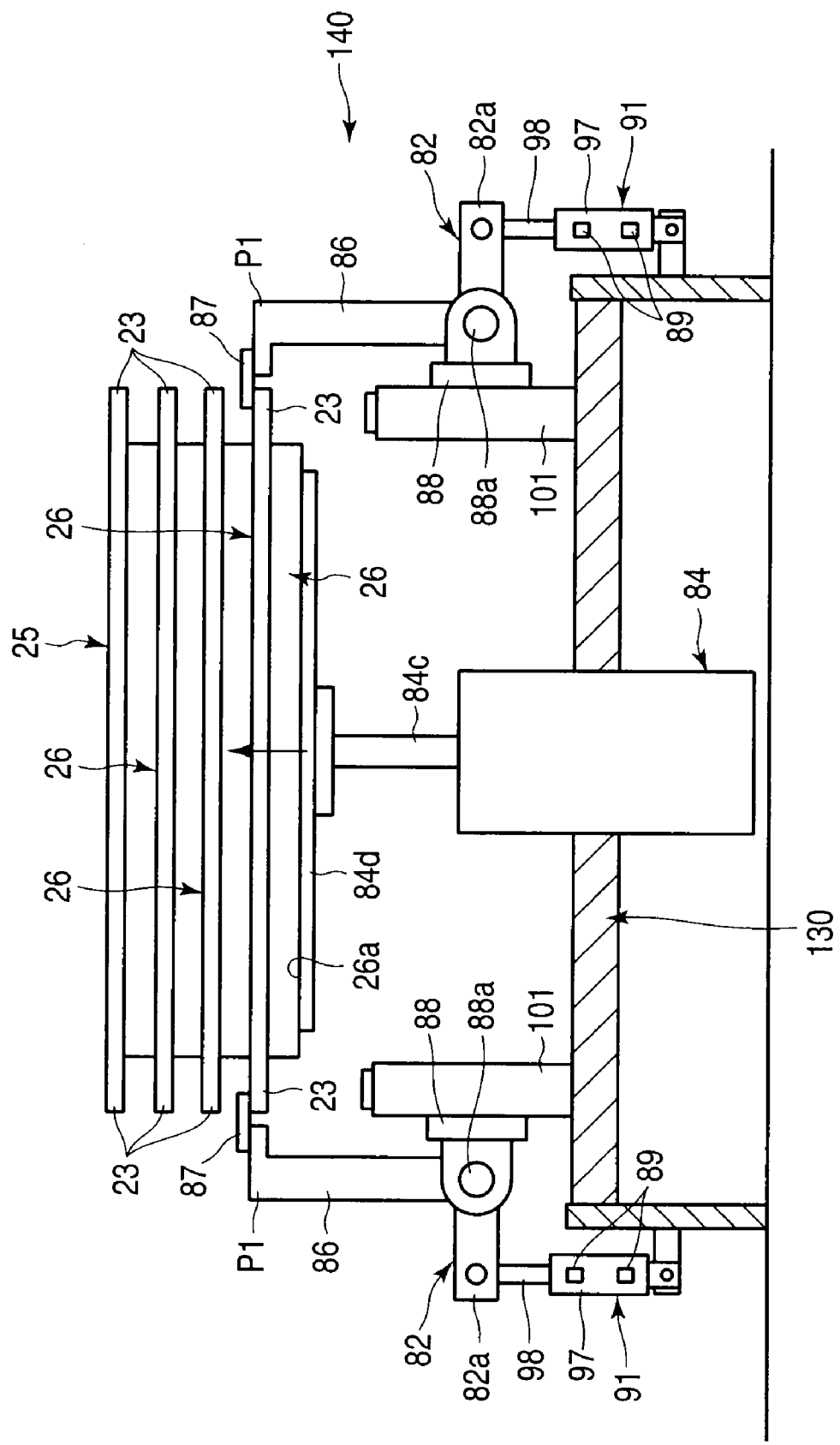
FIG. 14 is a front view (partly omitted) of the tray recovery device in the state in which the tray shown in FIG. 13 has been lifted to the place where this tray comes into contact with a stack of trays.

As shown in FIG. 14, the tray 26 is lifted by the lifting/lowering rod 84*c* to the place where this tray comes into contact with the stack 25. The lifting/lowering rod 84*c* further lifts the stack 25 to the place where the flanges 23 of the lowermost tray 26 of the stack 25 are separated from the corresponding support pawls 87 and the flanges 23 are moved away from the corresponding loci of the movements of the support pawls 87.

Figure 15:
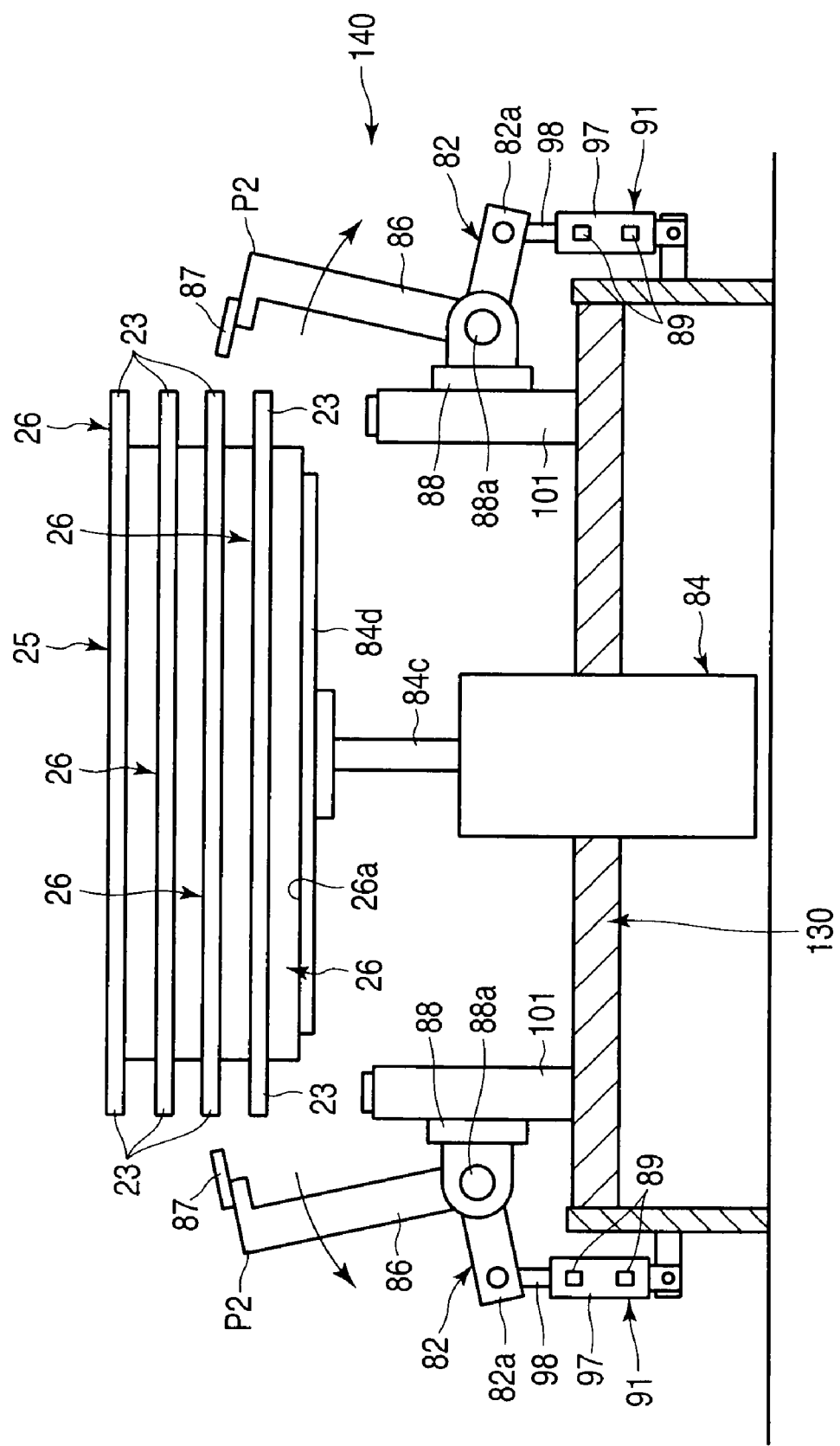
FIG. 15 is a front view (partly omitted) of the tray recovery device in the state in which the arms shown in FIG. 14 have moved to the second position.

As shown in FIG. 15, when the stack 25 of empty trays 26 has been moved to the place where the flanges 23 are moved away from the corresponding loci of the movements of the support pawls 87, the control device 110 drives the rotating rods 98 using the air pump 120, thereby moving the pair of arms 82 to the second position P2.

When the arms 82 are rotated to the second position P2, the recovered tray 26 and the stack 25 are supported by the plate 84d. Consequently, the recovered tray 26 is laid immediately below the stack 25 and incorporated into the stack 25.

Figure 16:
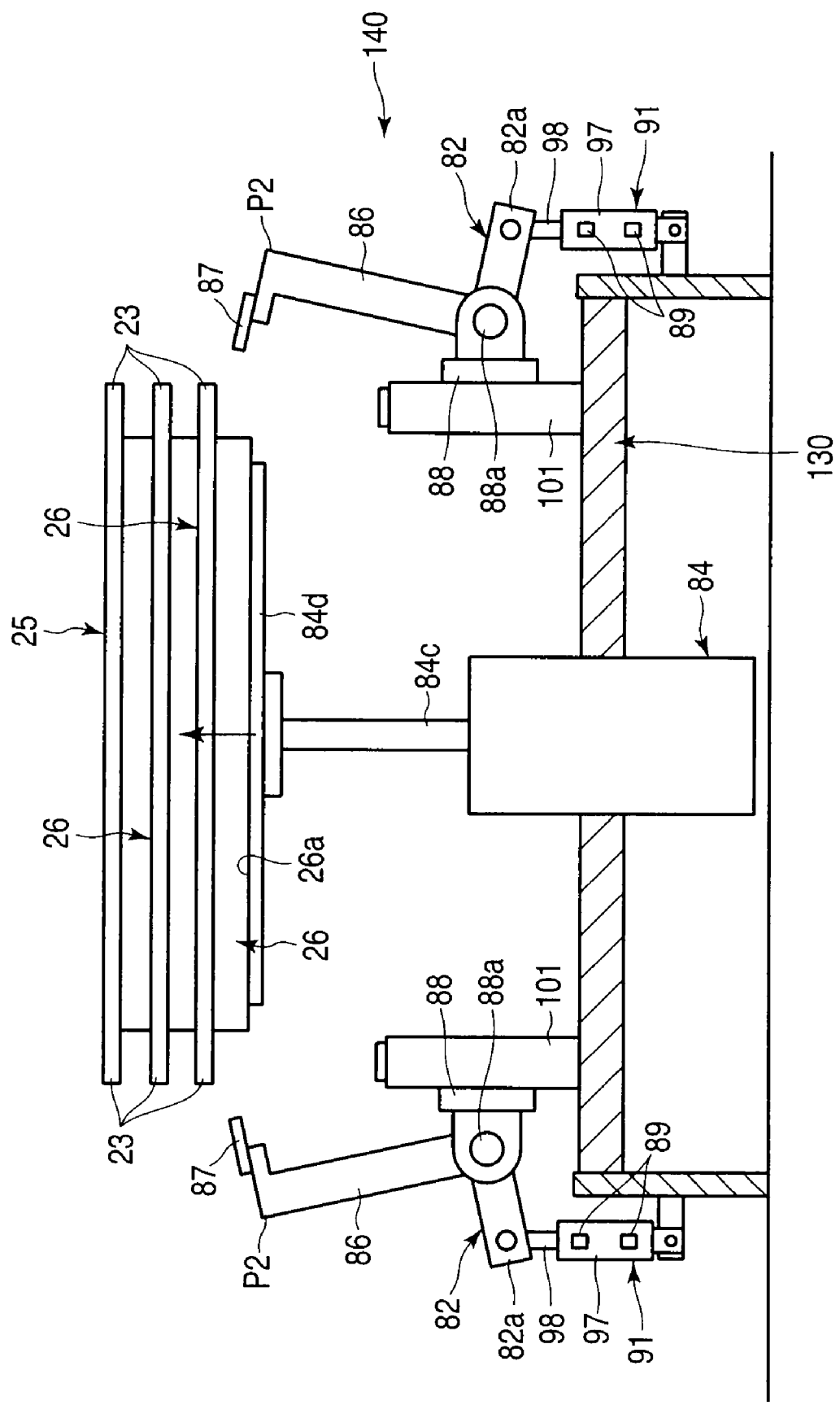
FIG. 16 is a front view (partly omitted) of the tray recovery device in the state in which the stack shown in FIG. 15 has been lifted.

As shown in FIG. 16, when the arms 82 have been rotated to the second position P2, the control device 110 drives the motor 84b, thereby further moving the lifting/lowering rod 84c upward. When the rod 84c has been further moved upward to the place where the lowermost tray 26 of the stack 25 is away from the loci of the movements of the support pawls 87, the control device 110 stops the drive of the lifting/lowering rod 84c.

Figure 17:
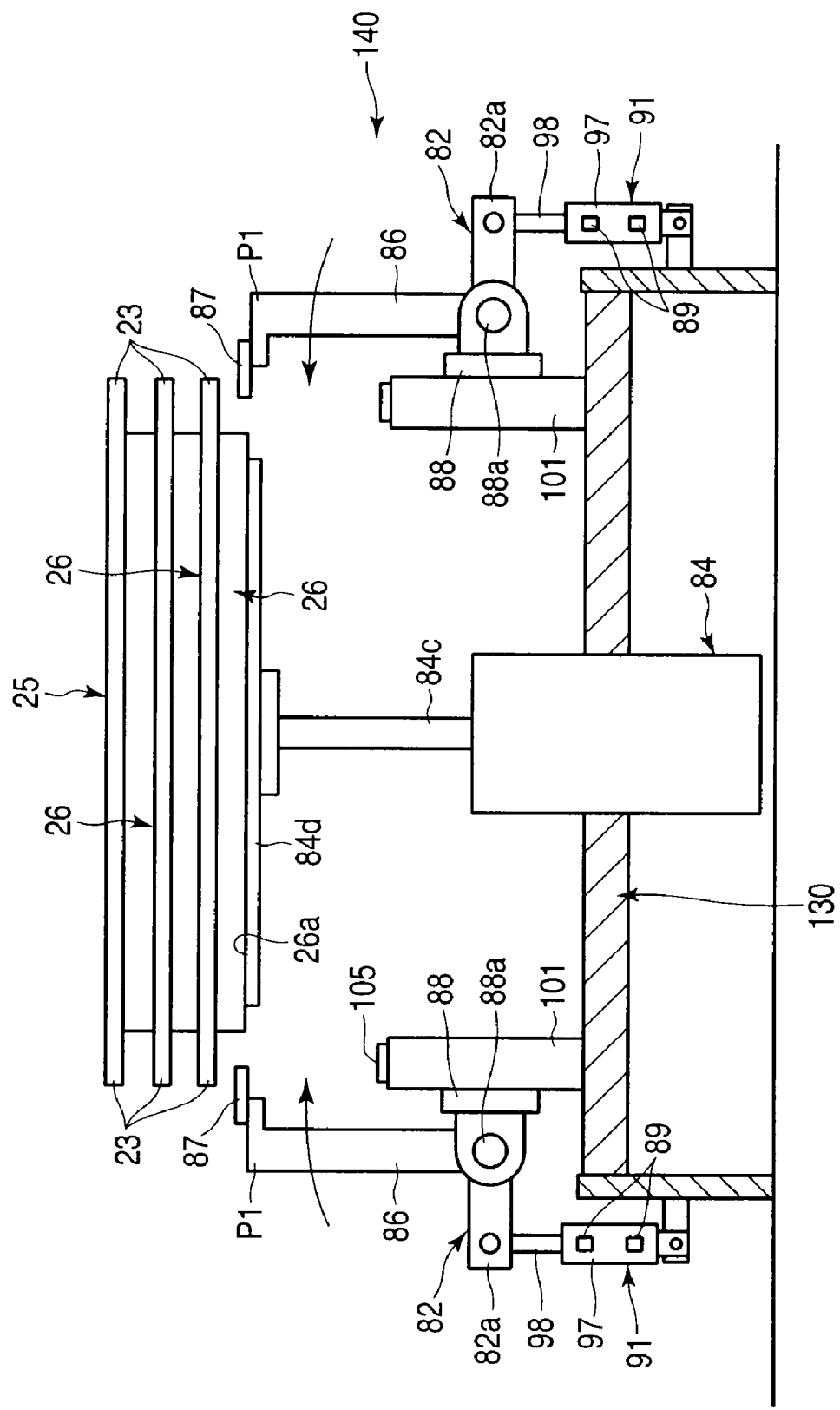
FIG. 17 is a front view (partly omitted) of the tray recovery device in the state in which the arms shown in FIG. 16 have moved to the first position.

As shown in FIG. 17, when the stack 25 is lifted so as to be away from the loci of the movements of the support pawls 87, the control device 110 drives the rotating rods 98, thereby rotating the corresponding arms 82 to the first position P1.

Figure 18:
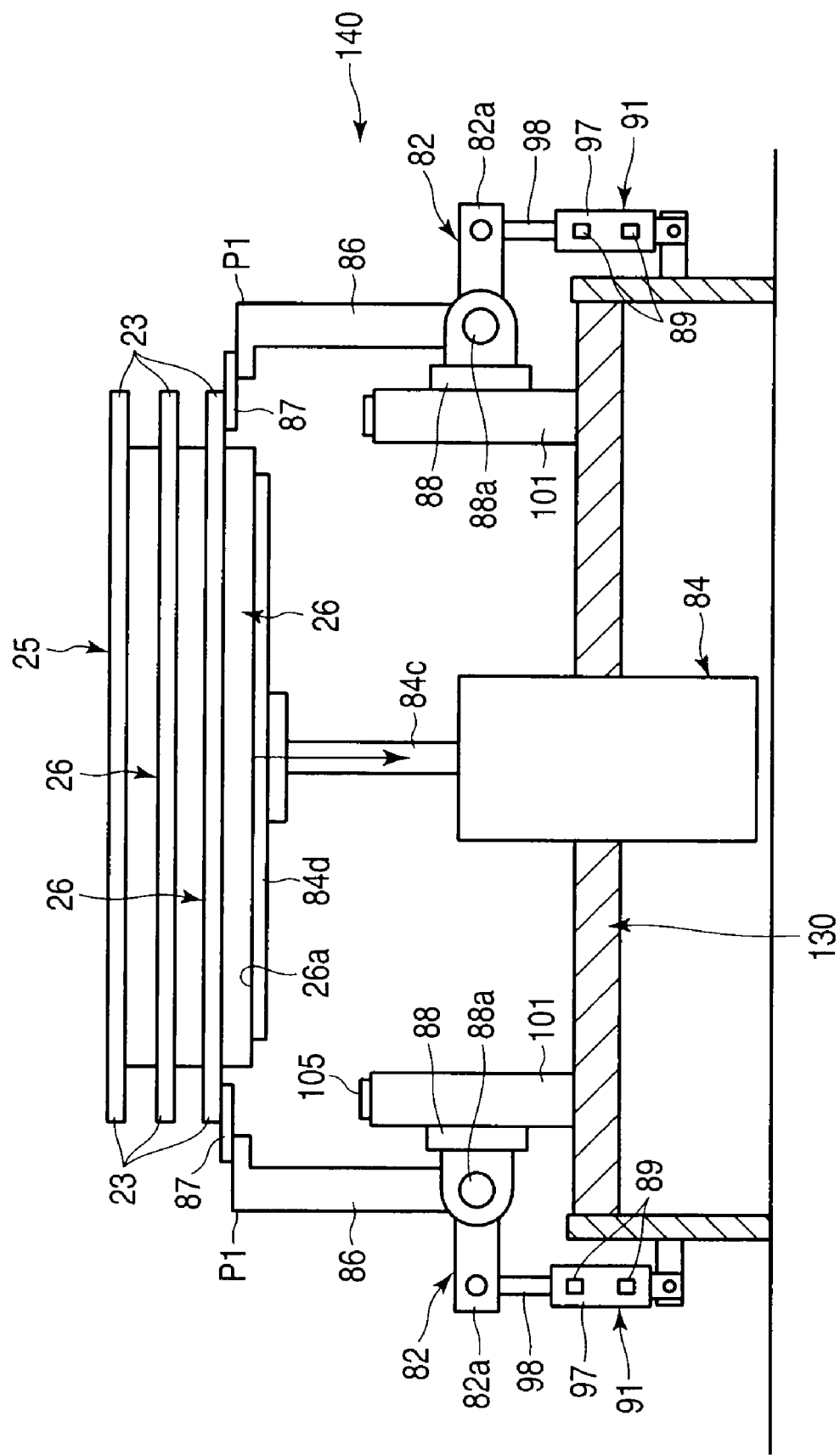
FIG. 18 is a front view (partly omitted) of the tray recovery device in the state in which the stack has been lowered so that the support pawls shown in FIG. 1 support this stack.

As shown in FIG. 18, when the arms 82 have been rotated to the first position P1, the control device 110 moves the lifting/lowering rod 84c downward so that the support pawls 87 support the stack 25. Consequently, the flanges 23 of the lowermost tray 26 are supported by the corresponding support pawls 87.

Thus, each tray 26 is supplied by the tray supply device 80 and recovered by the tray recovery device 140. Incidentally, the separation mechanism 83 is not required for the tray recovery device 140 and, it may be omitted. In the present embodiment, the tray recovery device 140 does not include the separation mechanism 83.

In addition, the recovery of the trays 26 by the tray recovery device 140 and the supply of the trays 26 by the tray supply device 80 may be undertaken simultaneously. In this case, the drives of the tray supply device 80 and tray recovery device 140 by their respective motors 84b may not be synchronized. The speed at which the lifting/lowering rod 84c for the tray supply device 80 is driven and that for the tray recovery device 140 are adjustable by the control device 110. Specifically, the control device 110 may have an input section, which enables an operator to adjust the speed at which each motor 84b is driven.

Additionally, the movement of the lifting/lowering device 84 of the tray supply device 80 refers to the first movement according to the present invention. The movement of the lifting/lowering device 84 of the tray recovery device 140 refers to the second movement according to the present invention.

In FIGS. 5 to 18, the guide members 150, wires 100a, 120a, 84f, and 89a, pipes 95 and 99, control device 110, and air pump 120 are not shown.

Since the tray supply device 80 of the foregoing configuration includes the lifting/lowering device 84, each tray 26 to be supplied is moved by the lifting/lowering device 84.

In other words, the structure of the tray supply device 80 allows the trays 26 to fall without disturbing the arrangement of components, such as liquid crystal panels 21, ICs 41, or FPCs 61, accommodated in them. Accordingly, the trays 26 can be stably supplied even when the trays 26 accommodate such components.

Further, the tray supply device 80 includes the separation mechanism 83, thereby preventing such failure as when no tray 26 is supplied.

The tray supply device 80 including the lifting/lowering device 84 can also be used as the tray recovery device 140.

Accordingly, the tray supply device 80 is capable of supplying trays accommodating components, preventing failure in tray supply, and recovering the trays as well using the same structure as that for the tray supply.

In addition, such a structure in which the separation devices 90 are fixed to the corresponding arms 82 and the separation pawls 94 significantly separate each tray 26 facilitates wiring and piping between the tray supply device 80 and the separation devices 90.

In this respect, a detailed description will be given below. The structure in which each separation device 90 is fixed to the corresponding arm 82 and has the corresponding separation pawl 94 allows the wires and pipes to be gathered near the arm 82. Further, this invention eliminates the need to separate each tray 26 by means of a sucking member or the like, and hence eliminates the need to lay pipes or the like, used for the sucking member, within the range of motion of the plate 84d, that is, inside the pair of belt conveyors 100. This facilitates wiring and piping.

Further, each of the arms 82 rotates around the corresponding rotation shaft 88a and the end 82a may be bent approximately 90° to the arm body 86. Additionally, the rotating devices 91 are disposed below the corresponding ends 82a. This reduces the dimensions of the tray supply device 80 in the direction in which the arms 82 are disposed opposite to each other. Accordingly, the tray supply device 80 can be made more compact.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tray holding apparatus comprising:
a holding section which holds a stack of trays, each tray including a tray body capable of accommodating items therein, and a flange extending in the direction of a perimeter of the tray body from an upper edge of the tray body, the holding section comprising a pair of arms which have corresponding support pawls capable of supporting the flange and which are supported so as to freely rotate between a first position where the support pawls support the flange from below and a second position where the support pawls are laterally separated from the stack, and from the flange,
two separation sections which respectively comprise two separation rods, two separation pawls each attached to the leading end of the corresponding separation rod, two separation cylinders each accommodating the corresponding separation rod to allow the separation rod to be advanced and retreated and being supported by the corresponding arm, and two driving devices each connected to the corresponding arm so as to be opposite to the corresponding support pawl with corresponding rotating shaft between them, and driving the corresponding arm between the first position and the second position;
a lifting and lowering section which moves upward and downward between a place below the stack and this stack, the lifting and lowering section enabling a first movement in which the separated tray is moved to the place below the stack and a second movement in which the tray in the place below the stack is moved to the stack; and a control section which controls operations of the separation section and the lifting and lowering section, wherein the separation pawls are able to be accommodated between the flange of a tray supported by the support pawls in the first position of the arms and the flange of a tray lying immediately below the tray supported by the support pawls, and being movable downward in relation to the support pawls.

2. The tray holding apparatus according to claim 1, wherein the driving devices are disposed below the corresponding arms.

* * * * *